United States Patent
McGarry (10) Patent No.: US 9,469,379 B2
(45) Date of Patent: Oct. 18, 2016

(54) MOTORCYCLE CHAIN GUIDE

(71) Applicant: T.M. Designworks, LLC, Phoenix, OR (US)

(72) Inventor: Timothy McGarry, Phoenix, OR (US)

(73) Assignee: T.M. Designworks, LLC, Phoenix, OR (US)

( * ) Notice: Subject to any disclaimer, the term of this patent is extended or adjusted under 35 U.S.C. 154(b) by 105 days.

(21) Appl. No.: 14/294,089

(22) Filed: Jun. 2, 2014

(65) Prior Publication Data

US 2015/0344105 A1 Dec. 3, 2015

(51) Int. Cl.
*F16H 7/18* (2006.01)
*B62J 13/00* (2006.01)
*F16D 1/00* (2006.01)
*F16H 57/02* (2012.01)
*B62M 9/16* (2006.01)
*B62M 9/00* (2006.01)

(52) U.S. Cl.
CPC ............... *B62M 9/16* (2013.01); *F16H 7/18* (2013.01); *B62M 2009/007* (2013.01); *F16H 2007/185* (2013.01)

(58) Field of Classification Search
CPC B62M 2009/007; B62M 9/16; B62M 9/136; F16H 7/18; B62J 13/00
USPC .................................. 474/140, 144
See application file for complete search history.

(56) References Cited

U.S. PATENT DOCUMENTS

| | | | | |
|---|---|---|---|---|
| 4,471,851 A * | 9/1984 | Kamiya | ................... | B62J 13/00 180/219 |
| 5,679,084 A * | 10/1997 | Daniels, III | ............. | B62M 9/16 474/140 |
| D532,720 S * | 11/2006 | McGarry | ................... | D12/127 |
| D600,600 S * | 9/2009 | McGarry | ................... | D12/127 |
| D601,465 S * | 10/2009 | McGarry | ................... | D12/127 |
| 7,691,019 B2 * | 4/2010 | Gogo | ....................... | B62J 13/00 474/111 |
| 7,708,662 B2 * | 5/2010 | Uchiyama | ................ | B62M 9/16 474/140 |
| 7,740,554 B2 * | 6/2010 | McGarry | ................. | B62J 13/00 474/140 |
| 7,771,303 B2 * | 8/2010 | Fuse et al. | ............... | B62M 9/16 474/111 |
| 8,534,693 B2 * | 9/2013 | Sloan et al. | ............. | B62J 13/00 280/284 |
| 8,561,750 B2 * | 10/2013 | Kakimoto et al. | ........ | B62M 9/16 180/357 |
| 8,961,342 B2 * | 2/2015 | Emura et al. | .......... | B62M 9/136 474/140 |
| 2005/0159260 A1* | 7/2005 | Gogo | ....................... | B62J 13/00 474/111 |
| 2007/0032324 A1* | 2/2007 | Uchiyama | ................ | B62M 9/16 474/140 |
| 2007/0042847 A1* | 2/2007 | Fuse | ........................ | B62M 9/16 474/140 |
| 2007/0087877 A1* | 4/2007 | McGarry | ................. | B62J 13/00 474/144 |
| 2007/0265121 A1* | 11/2007 | Gross | ....................... | B62J 13/00 474/144 |
| 2008/0227573 A1* | 9/2008 | Strombeck | ............... | B62J 13/00 474/144 |
| 2011/0203867 A1* | 8/2011 | Kakimoto et al. | ........ | F16H 7/18 180/357 |

* cited by examiner

*Primary Examiner* — Henry Liu
(74) *Attorney, Agent, or Firm* — Alleman Hall McCoy Russell & Tuttle LLP (57) ABSTRACT

A chain guide for guiding a chain traveling around a sprocket supported on a frame of a motorcycle is disclosed. Typically, the chain guide includes a U-shaped, plastic body with a channel formed along an inner surface to of the body and a plastic removable chain guide oriented such that a surface of the removable chain guide insert is facing the chain running through the channel. The inner and outer walls of the body configured with a first thickness along the top edge and downward to a bevel to a second, smaller thickness downward to a bottom edge along an outer surface.

24 Claims, 12 Drawing Sheets

MOTORCYCLE CHAIN GUIDE

BACKGROUND

Some motorcycles utilize a chain to transmit power from the motor to the rear wheel. Under some conditions, such as when the distance between the front and rear sprocket is substantial, undesirable chain motion may occur. Undesirable chain motion may adversely affect the operation of the motorcycle and/or result in rider injury.

One solution is to limit the motion of the drive chain through the use of a chain guide. The chain guide limits the deflection of the chain out of the plane of the motor and drive sprockets. Chain guides typically include a metal channel mounted to the frame of the motorcycle and a circular rubber insert through which the chain passes.

The metal shell of prior factory equipped chain guides imparts has the disadvantage that strong impact may permanently deform the chain guide. These deformations may result in contact of the chain with the sides of the internal channel of the chain guide resulting in excessive wearing, or even binding, of the chain.

Plastic chain guides have also been developed, but designing these guides to be strong enough to withstand repeated impacts can result in a bulky and consequently heavy part. Reduction of weight is of paramount importance to riders, particularly in race conditions. However, reducing weight while maintaining strength to withstand repeated sudden impacts is a challenge.

SUMMARY

A chain guide for guiding a chain traveling around a sprocket supported on a frame of a motorcycle is disclosed. Typically, the chain guide includes a U-shaped, plastic body with a channel formed along an inner surface of the body with a plastic removable chain guide supported by the body with its bottom surface positioned above the chain running through the channel. The inner and outer walls of the body are configured with a first thickness along the top edge and downward to a bevel, at which point the thickness transitions to a second, smaller thickness downward to a bottom edge along an outer surface. This configuration has the advantage of reducing weight while maintaining strength of the chain guide.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
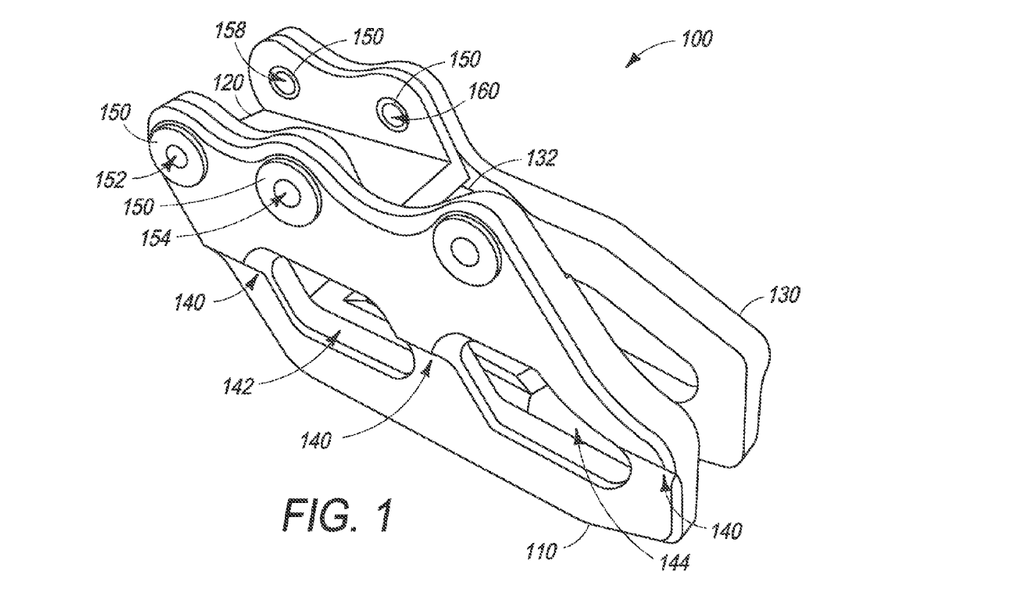
FIG. 1 shows a top rear isometric view of a chain guide according to a first example embodiment.
Figure 2:
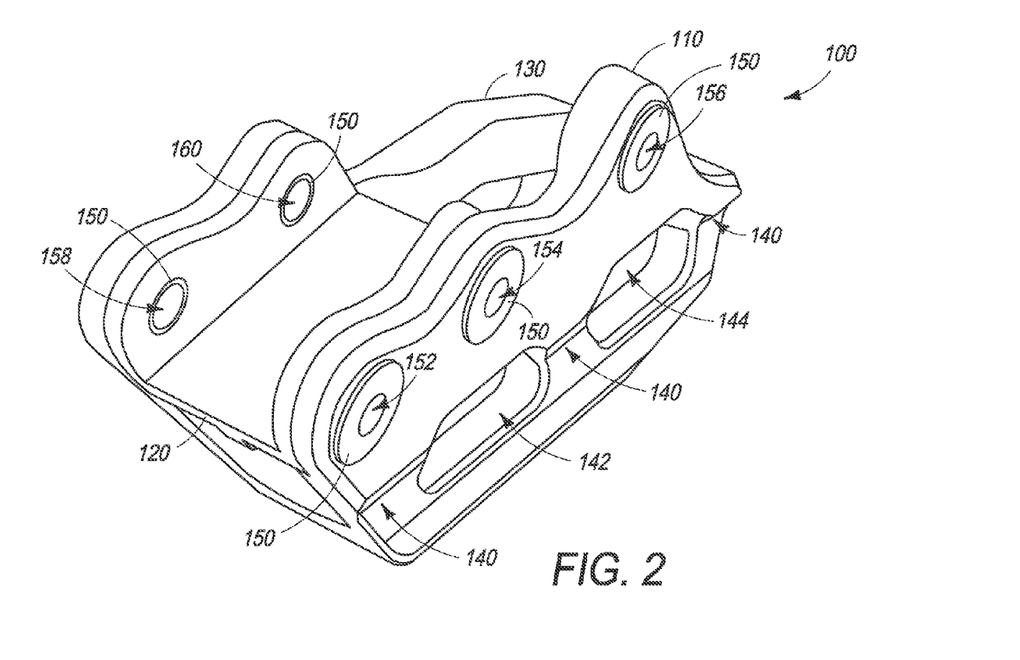
FIG. 2 shows a top front isometric view of the chain guide of FIG. 1.

Referring now to FIGS. 1 and 2, a chain guide 100 according to an example embodiment of the present disclosure is shown. Chain guide 100 typically includes a plastic outer chain guide support configured to mount to a motorcycle frame and a removable plastic chain guide insert 120. The chain guide support is typically constructed of a single piece of plastic and mounted to the motorcycle frame using mounting holes 152-160 and fasteners.

Chain guide 100 includes a substantially U-shaped body having an outer wall 110, a bottom portion 126, and an inner wall 130. When chain guide 100 is mounted to a motorcycle frame, outer wall 110 faces outward from the motorcycle and inner wall 130 faces inward toward the motorcycle. Intermediate outer wall 130 and inner wall 110, the U-shaped body of chain guide 100 and removable chain guide insert 120 form a channel to surround and guide a chain. The chain slides between outer wall 110 and inner wall 130 and below removable chain guide insert 120.

Outer wall 110 may be configured with openings 142 and 144 and inner wall 130 may be configured with openings 146 and 148 to allow for expulsion of debris and/or foreign material during chain operation. Openings 142 and 146 are typically aligned as are openings 144 and 148. However, it will be appreciated that other configurations are possible.

Outer wall 110 may be further provided with a plurality of circular mounting holes 152, 154, and 156. Inner wall 130 also includes a plurality of circular mounting holes 158 and 160. Mounting holes 152 and 154 are configured to align with mounting holes 158 and 160 to facilitate mounting chain guide 100 to the motorcycle frame. Each mounting hole 152, 154, 156, 158, and 160 is sized to fit a bushing 150 through each hole to minimize wear of the respective mounting hole by a fastener. It will be appreciated that other suitable configurations of mounting holes 152-160 may be provided to facilitate mounting chain guide 100 to motorcycle frames of various shapes and sizes.

Figure 3:
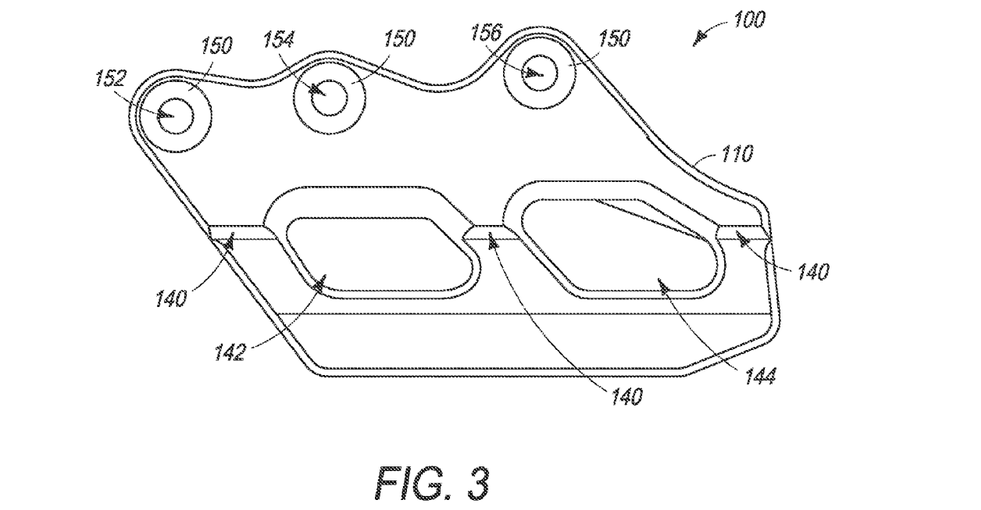
FIG. 3 shows a right side view of the chain guide of FIG. 1.

Referring to FIG. 3, outer wall 110, when viewed from the side, is configured with a trapezoidal shape with the front and rear side edges sloping rearward from top to bottom. Outer wall 110 is further configured with a first thickness along the top edge and downward to a bevel 140 to a second, smaller thickness downward to a bottom edge along an outer surface. Typically, the topmost edge of bevel 140 is 25-30% of the height as measured along the front edge of the wall from the top edge. Bevel 140 connects the thicker wall portion to the thinner wall portion at an angle of 20 to 40 degrees from vertical. The thinner wall portion may be 25-40%, preferably 30%, thinner than the thicker wall portion. The wall portion along the top edge is thicker to provide additional support to outer wall 130 around mounting holes 152, 154 and 156. Bevel 140 allows a transition to the second smaller thickness allowing for a reduction in the weight of chain guide 100 while maintaining an overall structural integrity.

Outer wall 110 may be configured such that a first of the three mounting holes 152 is positioned adjacent an intersection of a front leading edge and a top edge of outer wall 110. The second of the three mounting holes 154 is positioned aft of mounting hole 152 adjacent the top edge of outer wall 110. A third of the three mounting holes 156 is positioned aft of mounting hole 154 adjacent the top edge of outer wall 110.

FIG. 3 shows outer wall 110 substantially aligned with inner wall 130 when viewed from the side. Further, outer wall 110 and inner wall 130 are aligned such that mounting holes 152 and 154 of outer wall 110 and mounting holes 158 and 160 of inner wall 130 are aligned to allow a fastener to pass through mounting hole 152, a motor cycle frame member, and mounting hole 158. Mounting holes 154 and 160 are similarly aligned to receive a fastener. Mounting hole 156 is configured such that a fastener may pass through directly to a motorcycle frame member.

Figure 4:
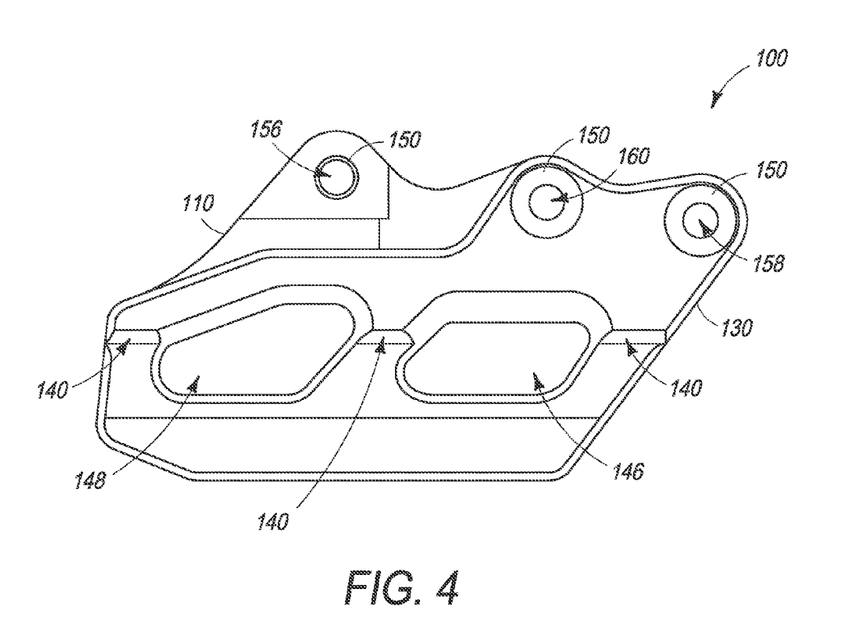
FIG. 4 shows a left side view of the chain guide of FIG. 1.

Referring now to FIG. 4, inner wall 130 is similarly configured to outer wall 110 with a trapezoidal configuration and a first thickness along the top edge and downward to a bevel 140 to a second, smaller thickness downward to a bottom edge along an outer surface. Inner wall 130 is configured with a plurality of mounting holes 158 and 160. Mounting holes 158 and 160 are circular and sized to fit a bushing 150 and a mounting fastener. Inner wall 130 is configured such that a first of the two mounting holes, mounting hole 158, is positioned adjacent an intersection of a front leading edge and a top edge and a second mounting hole 160 is positioned aft of the first mounting hole adjacent the top edge of the inner wall.

Further, mounting holes 158 and 160 are aligned as discussed above with reference to mounting holes 152 and 154 of outer wall 110.

Figure 5:
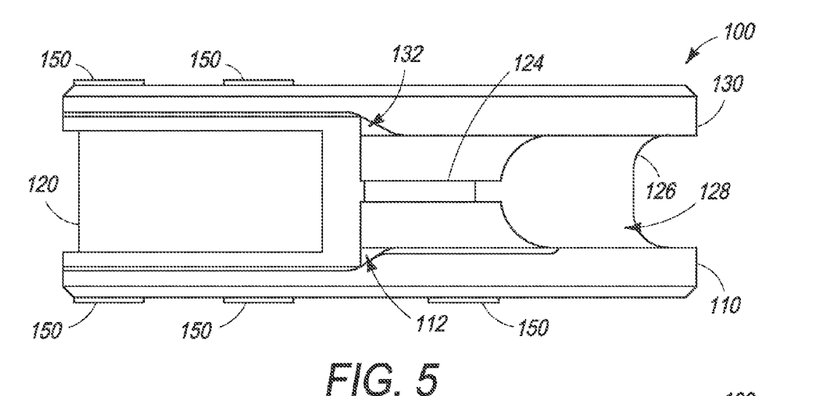
FIG. 5 shows a top view of the chain guide of FIG. 1.

FIG. 5 is a schematic diagram of a top view of chain guide 100. Removable chain guide insert 120 fits between outer wall 110 and inner wall 130. Outer wall 110 and inner wall 130 are configured with a shelf on the inward facing side of the wall. The shelf along the inward facing side of the wall is machined such that the thickness of both inner wall 130 and outer wall 110 is reduced by 40-45% from the top edge to 60-70% of the height and extends longitudinally for half the length of chain guide 100 to accommodate removable chain guide insert 120. Preferably, the reduction in inner wall 130 and outer wall 110 will be machined to reduce the thickness by 40%.

The bottom side of removable chain guide insert 120 rests upon outer wall shelf 112 and inner wall shelf 132. Bottom 126 of chain guide 100 is configured with a ridge 124. Bottom ridge 124 runs along a longitudinal axis from the frontward edge to the beginning of slope 128. Slope 128 encompasses the rearmost 25-40%, preferably 35% of the length of bottom 126 with a slope of 15 to 20 degrees to the rear edge of bottom 126.

It will also be appreciated that chain guide 100 and removable chain guide insert 120 are configured such that the thickness of the vertical members of removable chain guide insert 120 functionally replace the material removed from inner wall 130 and outer wall 110 along inner wall shelf 132 and outer wall shelf 112. Thus, removable chain guide 120 can provide lateral support to chain guide 100 while enclosing the channel at the top. Further, the vertical walls of removable chain guide insert act to reinforce inner wall 130 and outer wall 110 around the mounting holes facilitating further reduction in the weight without reducing the structural integrity of chain guide 100.

Figure 6:
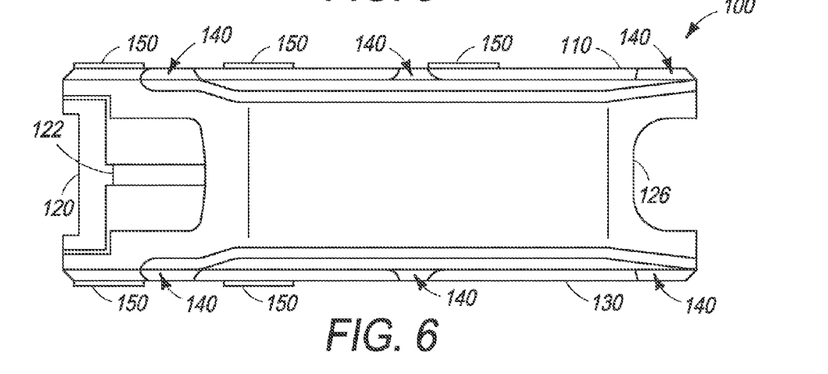
FIG. 6 shows a bottom view of the chain guide of FIG. 1.
Figure 7:
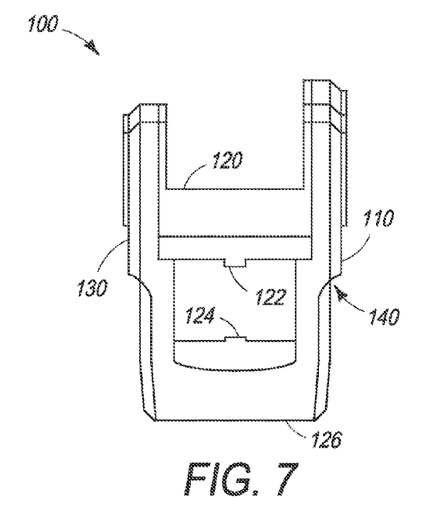
FIG. 7 shows a front view of the chain guide of FIG. 1.
Figure 8:
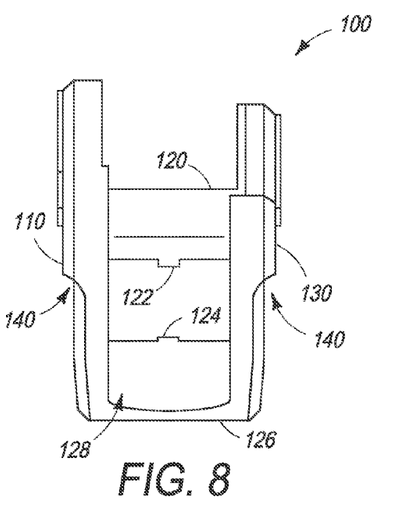
FIG. 8 shows a back view of the chain guide of FIG. 1.

FIG. 6 is a schematic diagram of a bottom view of chain guide 100. Insert ridge 122 along the bottom side of removable chain guide insert 120 is visible from the bottom. Insert ridge 122 runs the length of removable chain guide insert 120 along the longitudinal axis at the centerline. As shown in FIGS. 7 and 8, insert ridge 122 and bottom ridge 124 are aligned along the longitudinal centerline of removable chain guide insert 120 and bottom 126, and server to help align the chain as it runs through the channel of the chain guide.

As illustrated in FIGS. 7 and 8, removable chain guide insert 120 is configured with an essentially U-shaped body. Removable chain guide insert 120 is housed between inner wall 130 and outer wall 120 such that mounting holes within the vertical walls align with the mounting holes 152, 154, 158, and 160 of the chain guide. Removable plastic chain guide 120 is further configured such that a top edge aligns with the top edge of the inner wall 130 and the top edge of the outer wall 110 of chain guide 110. Removable chain guide insert 120 is held in place during operation by the fasteners mounting chain guide 100 to the motorcycle frame.

Figure 9:
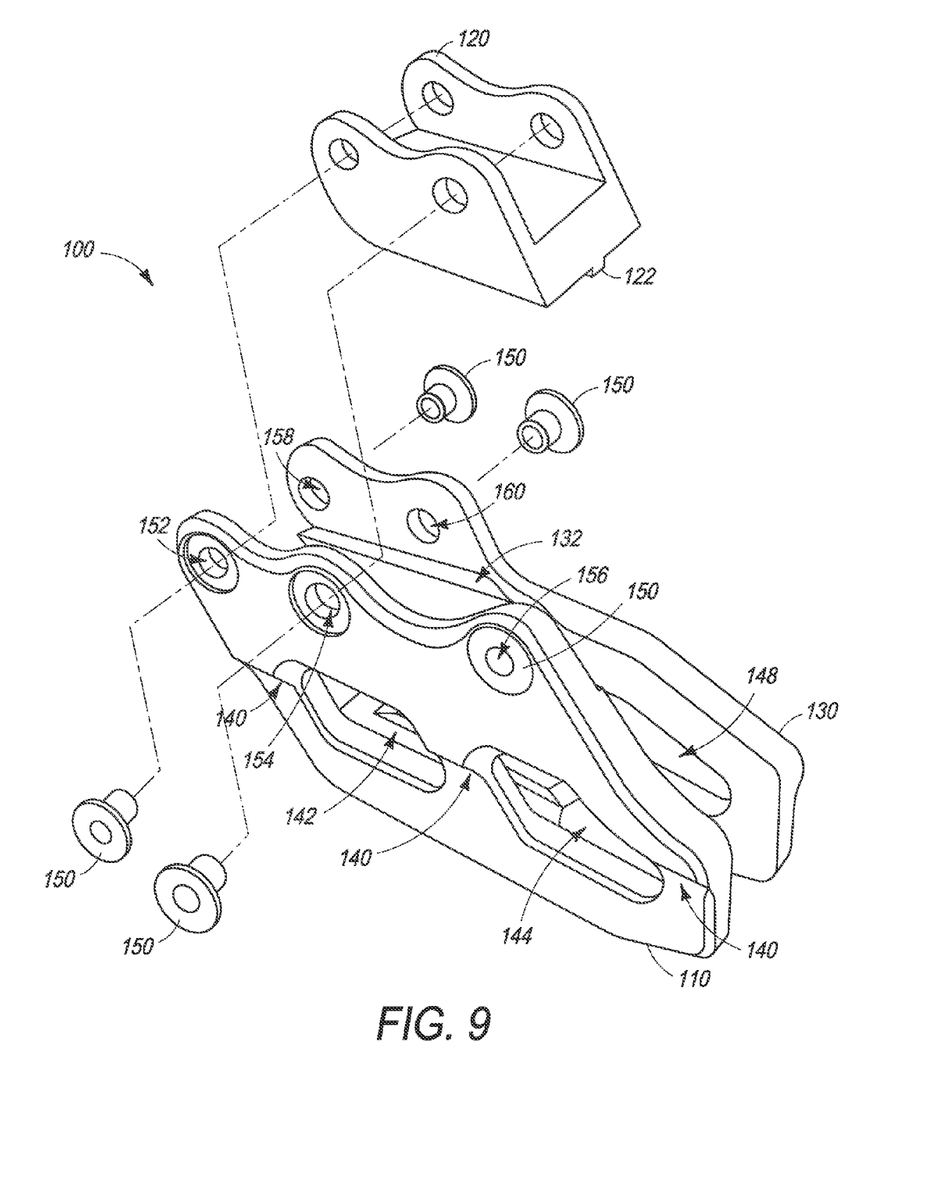
FIG. 9 shows an exploded isometric view of the chain guide of FIG. 1.
Figure 10:
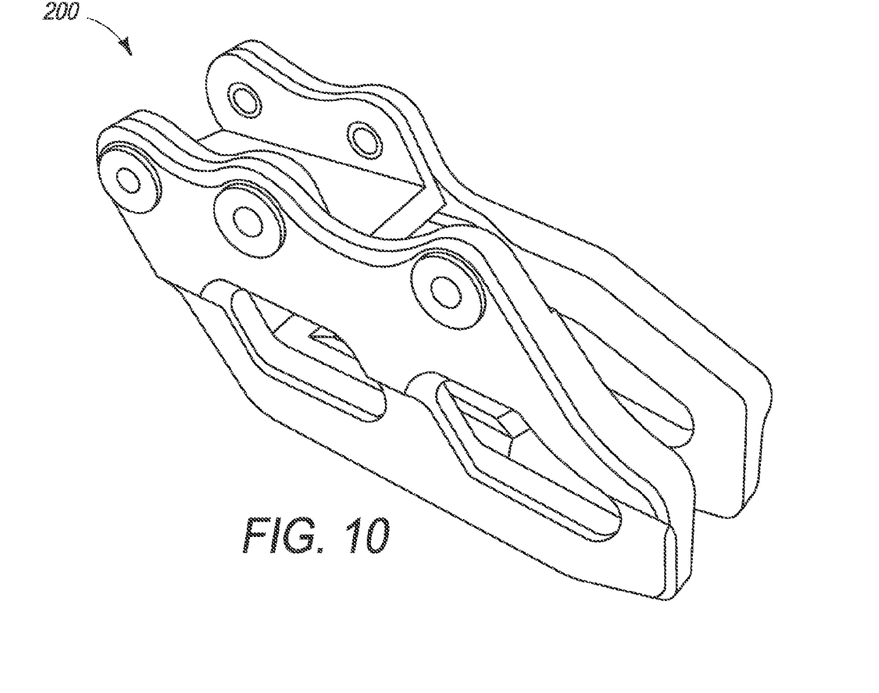
FIG. 10 shows a top rear isometric view of a chain guide according to a second example embodiment.
Figure 11:
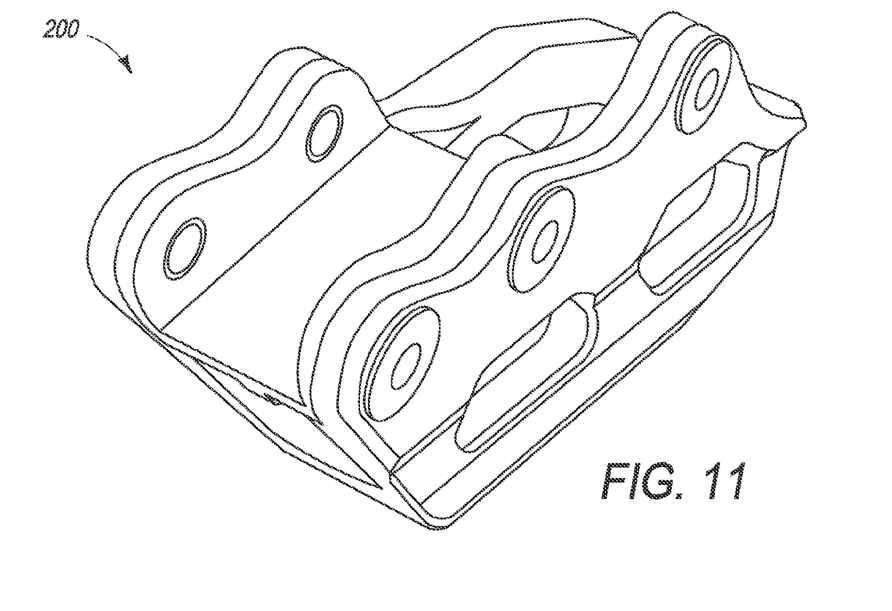
FIG. 11 shows a top front isometric view of the chain guide of FIG. 10.

FIG. 9 schematically illustrates an exploded view of chain guide 100.

Regarding FIGS. 10-18, a second example embodiment of a chain guide 200 is presented. Chain guide 200 includes a substantially U-shaped plastic body and is substantially similar to chain guide 100 described above, except with respect to a few properties that facilitate mounting chain guide 200 to a motorcycle frame of a different manufacturer. Thus, for the sake of brevity, only the design differences between chain guide 200 and chain guide 100 will be discussed in detail. FIGS. 10-18 correspond to the respective views illustrated in FIGS. 1-9.

Figure 12:
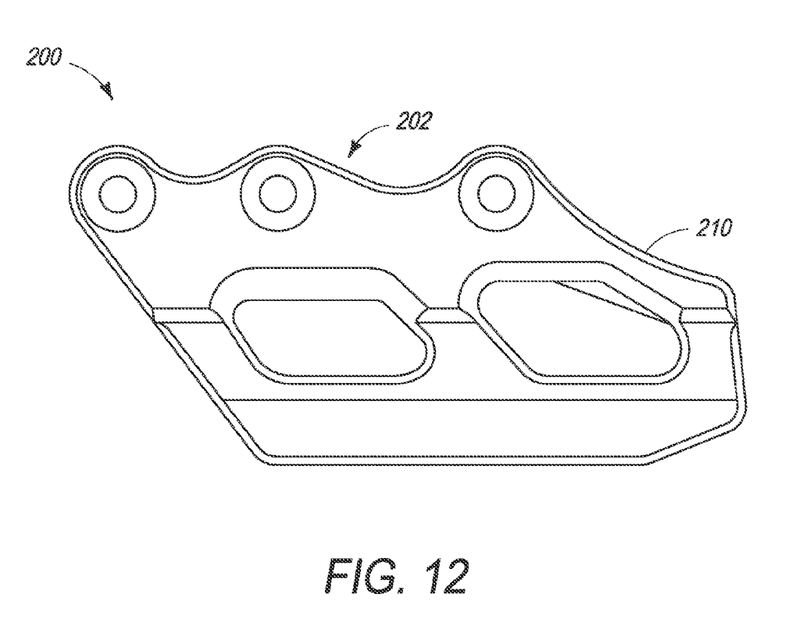
FIG. 12 shows a right side view of the chain guide of FIG. 10.
Figure 13:
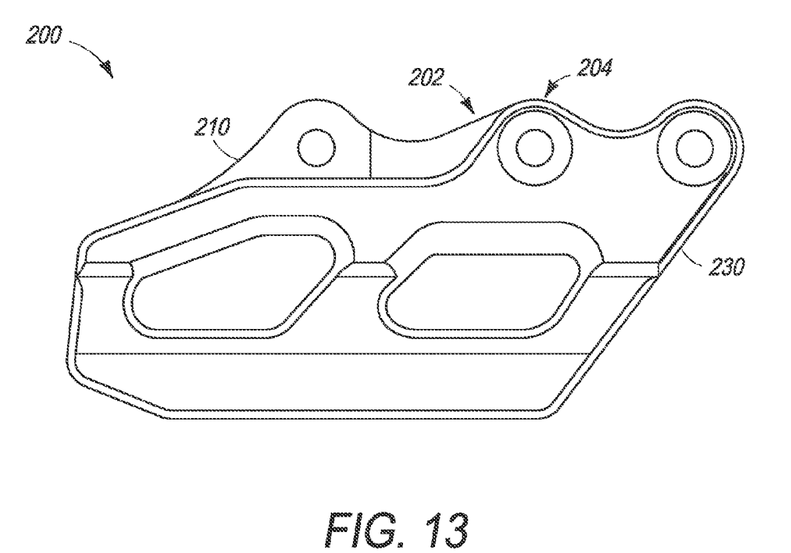
FIG. 13 shows a left side view of the chain guide of FIG. 10.
Figure 14:
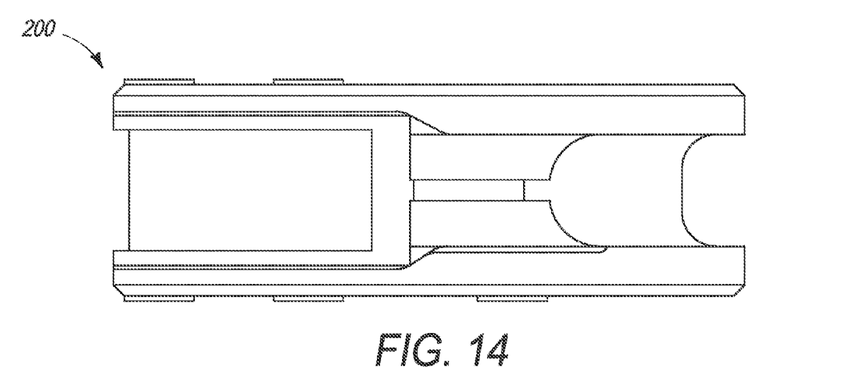
FIG. 14 shows a top view of the chain guide of FIG. 10.
Figure 15:
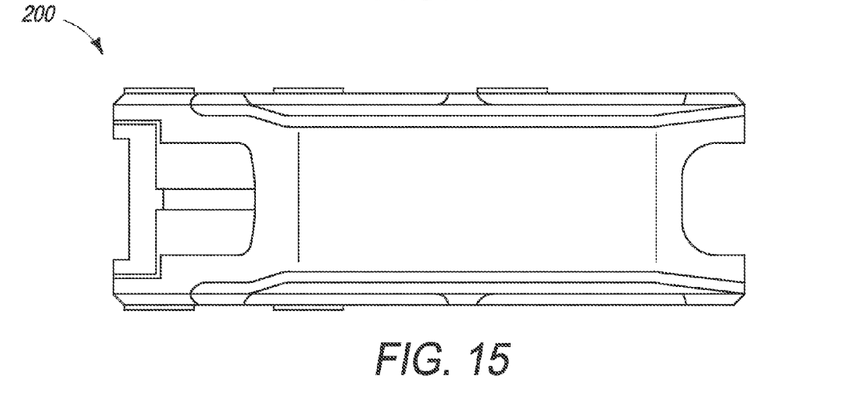
FIG. 15 shows a bottom view of the chain guide of FIG. 10.

Turning now to FIG. 12, top edge 202 of outer wall 210 of chain guide 200 includes a shallower curvature from intersection of the front edge and top edge 202 and aft than the respective top edge region of chain guide 100. A similar shallower radius of curvature is present along the top edge 204 of inner wall 230 as shown in FIG. 13. This difference in curvature along the top edges of the inner and outer walls of chain guide 200 may be present to allow clearance for motorcycle frame members.

Figure 16:
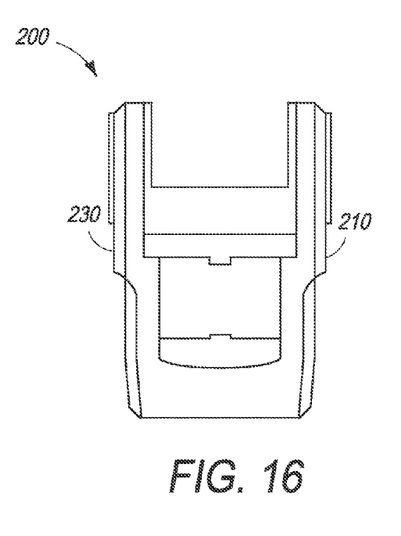
FIG. 16 shows a front view of the chain guide of FIG. 10.
Figure 17:
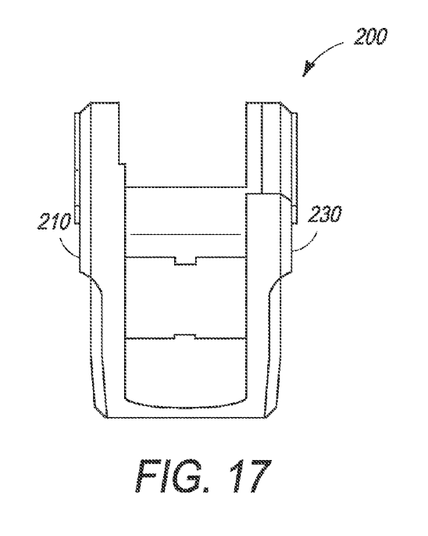
FIG. 17 shows a back view of the chain guide of FIG. 10.

FIGS. 16 and 17 show that outer wall 210 and inner wall 230 of chain guide 200 may be configured to the same height. As discussed above, this property of chain guide 200 facilitates mounting of the chain guide to specific motorcycle frame configurations.

Figure 18:
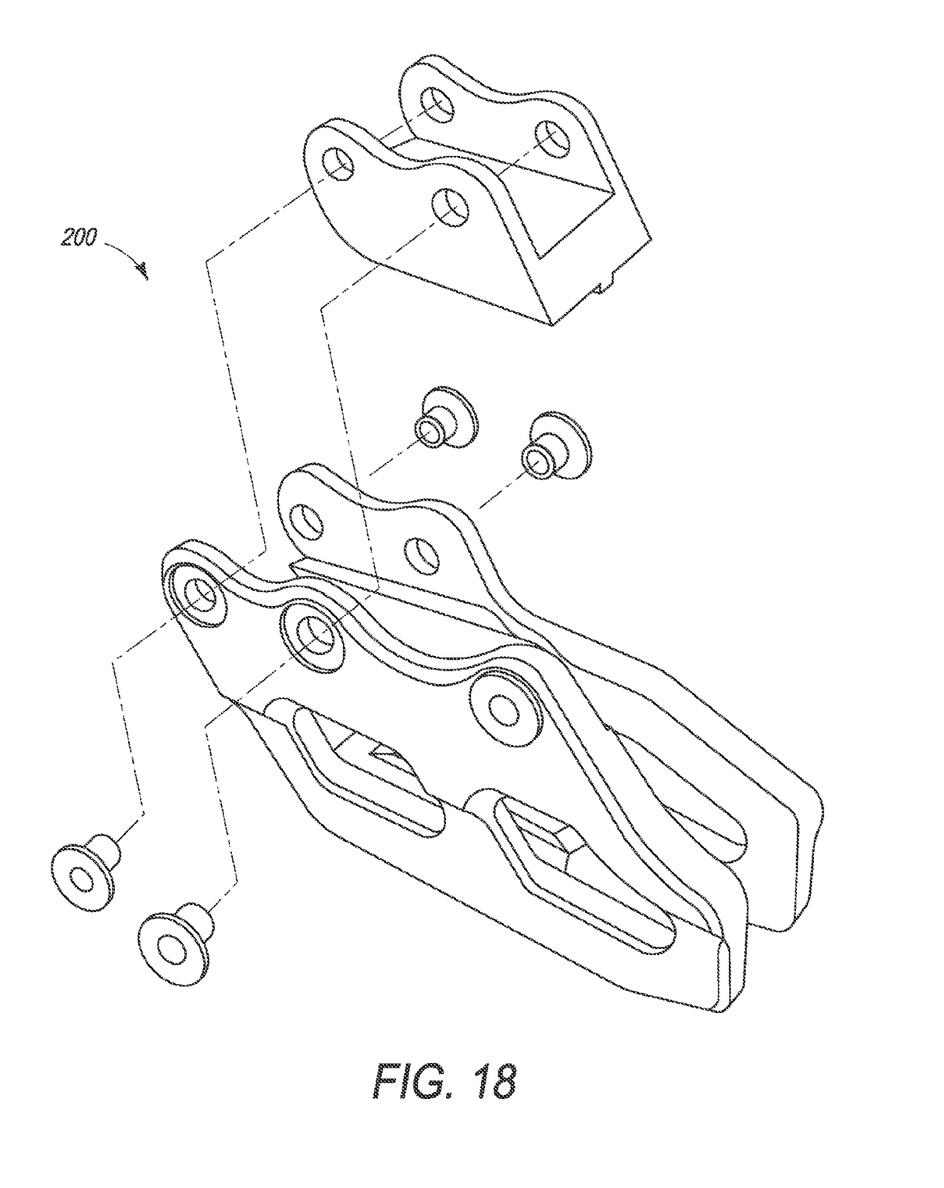
FIG. 18 shows an exploded isometric view of the chain guide of FIG. 10.

FIG. 18 schematically illustrates an exploded view of chain guide 200.

Figure 19:
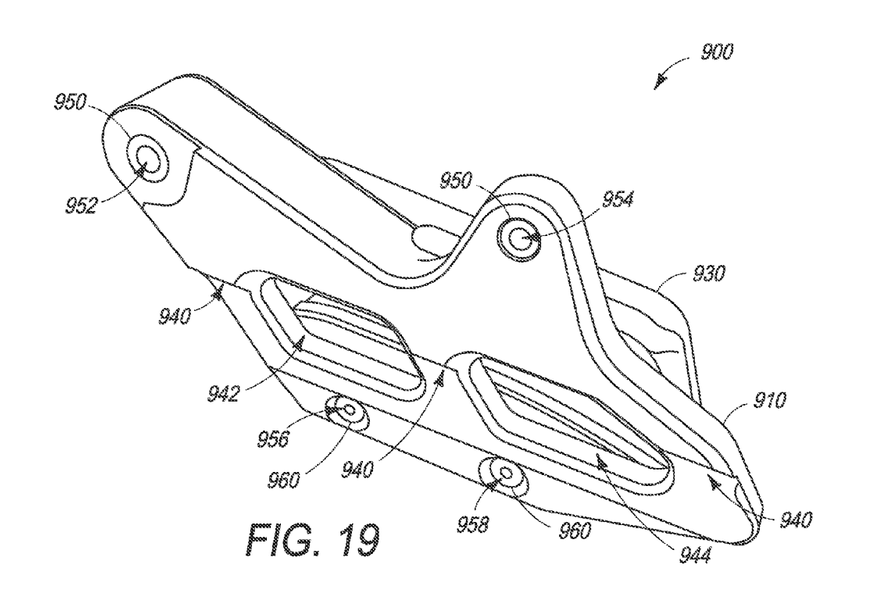
FIG. 19 shows a top rear isometric view of a chain guide according to a second example embodiment.
Figure 20:
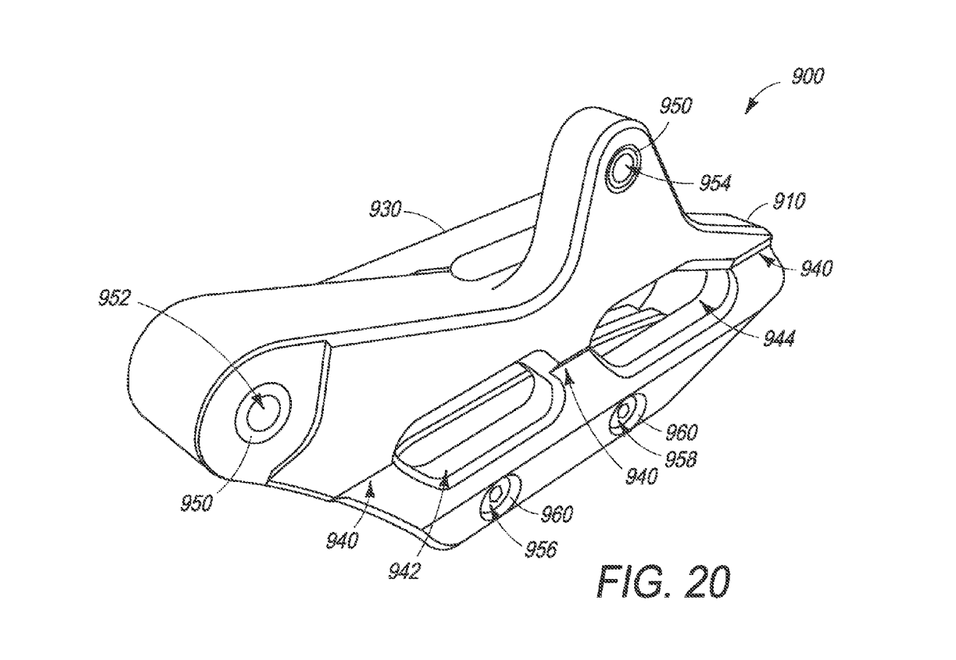
FIG. 20 shows a top front isometric view of the chain guide of FIG. 19.

Referring now to FIGS. 19 and 20, a chain guide 900 according to a third example embodiment of the present disclosure is shown. Chain guide 900 typically includes a plastic outer chain guide support configured to mount to a motorcycle frame and a removable plastic chain guide insert 920. The chain guide support is typically constructed of a single piece of plastic and mounted to the motorcycle frame using mounting holes 952, 954 and fasteners.

Chain guide 900 includes an inverted substantially U-shaped body having an outer wall 910, an upper surface 926, and an inner wall 930. When chain guide 900 is mounted to a motorcycle frame, outer wall 910 faces outward from the motorcycle and inner wall 930 faces inward toward the motorcycle. Intermediate outer wall 930 and inner wall 910, the U-shaped body of chain guide 900 and removable chain guide insert 920 form a channel to surround and guide a chain. The chain slides between outer wall 910 and inner wall 930 and above removable chain guide insert 920.

Beginning at the front edge and from a top edge and downward to the bottom surface of the upper portion of the channel, outer wall 910 is configured with a first thickness of 50-70%, preferably 60%, of the total width of the chain guide body. The first thickness is maintained in an aft direction for 40% of the longitudinal length of outer wall 910 where outer wall 910 is machined to a second thickness of 50% of the first thickness. Continuing aft along outer wall 910 a second taper to a third thickness occurs at 90% of the longitudinal length. The third thickness of outer wall 910 is 20-30%, preferably 25%, of the first thickness. At 50% of the longitudinal length, outer wall 910 is further configured with vertical protuberance having a thickness of 25-40%, preferably 35%, of the first thickness of outer wall 910.

Outer wall 910 may be configured with openings 942 and 944 and inner wall 930 may be configured with openings 946 and 948 to allow for expulsion of debris and/or foreign material during chain operation. Openings 942 and 946 are typically aligned as are openings 944 and 948. However, it will be appreciated that other configurations are possible.

Outer wall 910 is further provided with a plurality of circular mounting holes 952 and 954. Mounting holes 952 and 954 are configured to facilitate mounting chain guide 900 to the motorcycle frame. Each mounting hole 952 and 954 is sized to fit a bushing 950 through each hole to minimize wear of the respective mounting hole by a fastener. It will be appreciated that other suitable configurations of mounting holes 952 and 954 may be provided to facilitate mounting chain guide 900 to motorcycle frames of various shapes and sizes. Outer wall 910 is further configured with a plurality of holes along a bottom edge. Hole 956 is located just aft of the junction of the front edge and bottom edge of outer wall 910. Hole 958 is located aft of hole 956 along the bottom edge of outer wall 910. Holes 956 and 958 are sized to receive a fastener 960 and aligned with holes 970 and 972 of inner wall 930. When installed fasteners 960 pass through removable chain guide insert 920 between outer wall 910 and inner wall 930 such that removable chain guide insert forms a lower boundary of the channel below the chain.

Figure 21:
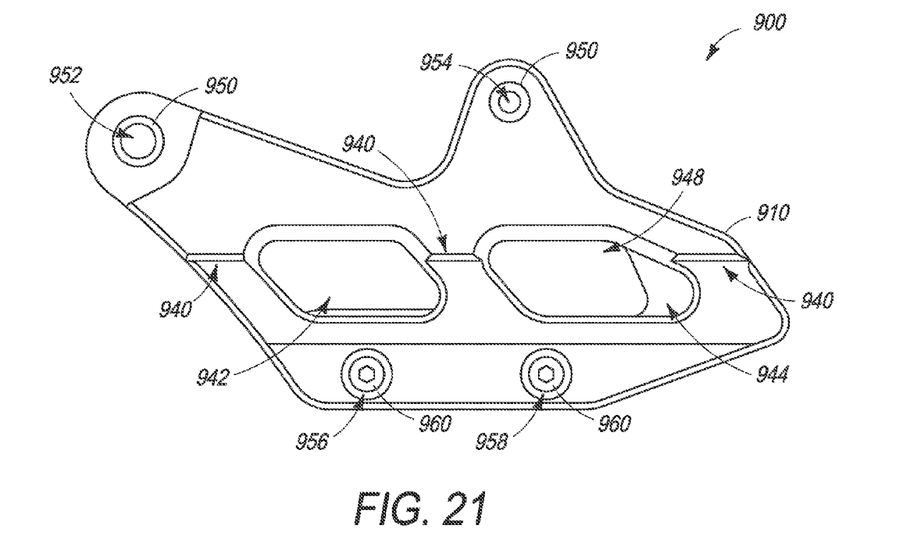
FIG. 21 shows a right side view of the chain guide of FIG. 19.

Referring now to FIG. 21, outer wall 910, when viewed from the side, is configured with a trapezoidal shape with the front and rear side edges sloping rearward from top to bottom. Outer wall 910 is further configured with a first thickness along the top edge and downward. As chain guide 900 is an inverted U configuration the first thickness proceeds downward to the upper surface of the channel where the inner surface of outer wall 910 is machined reducing the thickness of outer wall 910 to 20-30%, preferably 25%, of the first thickness to accommodate the travel of the chain. Moving downward along the exterior surface of outer 910 a bevel 940 to a smaller thickness downward to a bottom edge is located. Typically, the topmost edge of bevel 940 is 25-30% from the top edge as measured along the front edge of the wall. Bevel 940 connects the thicker wall portion to the thinner wall portion at an angle of 20 to 40 degrees from vertical. The thinner wall portion is 40-50%, preferably 45%, thinner than the thicker wall portion at the top edge of bevel 940. The wall portion along the top edge is thicker to provide additional support to outer wall 930 around mounting hole 952. Bevel 940 allows a transition to the smaller thickness allowing for a reduction in the weight of chain guide 900 while maintaining an overall structural integrity.

Outer wall 910 is configured such that a first of the two mounting holes 952 is positioned adjacent an intersection of a front leading edge and a top edge of outer wall 910. The second mounting hole 954 is positioned aft of mounting hole 952 adjacent the top edge of outer wall 910 and in a vertical protuberance.

FIG. 21 shows outer wall 910 substantially aligned with inner wall 930 when viewed from the side.

Figure 22:
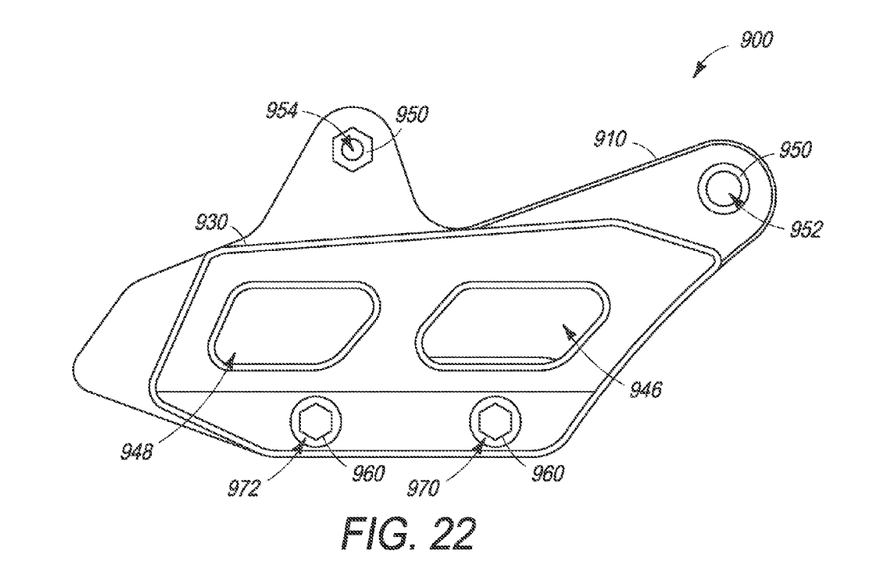
FIG. 22 shows a left side view of the chain guide of FIG. 19.

Referring now to FIG. 22, inner wall 930 is similarly configured in a trapezoidal configuration. Inner wall 930 is configured such that the top edge of inner wall 930 is substantially lower to allow sufficient clearance for a motorcycle frame member and such that a fastener passing through mounting hole 952 and mounting hole 954 may be received directly by the motorcycle frame member. Inner wall 130 is configured with a plurality of holes 970 and 972 along a bottom edge of inner wall 930. Holes 970 and 972 are circular and sized to fit fastener 960 passing through holes 956 and 958 and removable chain guide insert 920.

Figure 23:
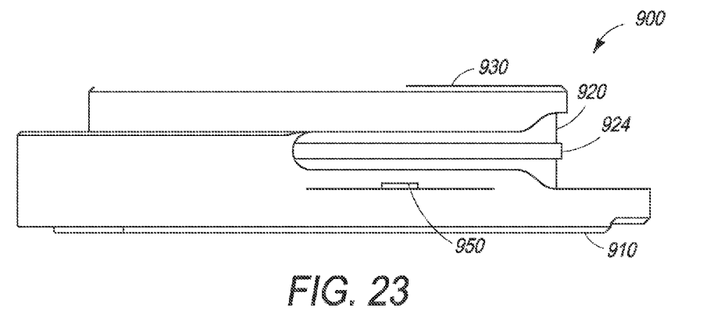
FIG. 23 shows a top view of the chain guide of FIG. 19.

FIG. 23 is a schematic diagram of a top view of chain guide 900. Removable chain guide insert 920 fits between outer wall 910 and inner wall 930.

The upper side of removable chain guide insert 920 forms the lower boundary of the channel and is secured in place by fasteners. The upper surface of removable chain guide insert 920 is configured with a ridge 124. Ridge 124 runs along a longitudinal axis from the frontward edge to the beginning of slope 928. Slope 928 encompasses the rearmost 25-40% of the length of removable chain guide 920 with a slope of 15 to 20 degrees to the rear edge of removable chain guide 920.

It will also be appreciated that chain guide 900 and removable chain guide insert 920 are configured such that the removable chain guide insert 920 forms the lower boundary of the channel. Thus, removable chain guide 920 can provide both horizontal support to chain guide 900 while enclosing the channel at the bottom.

Figure 24:
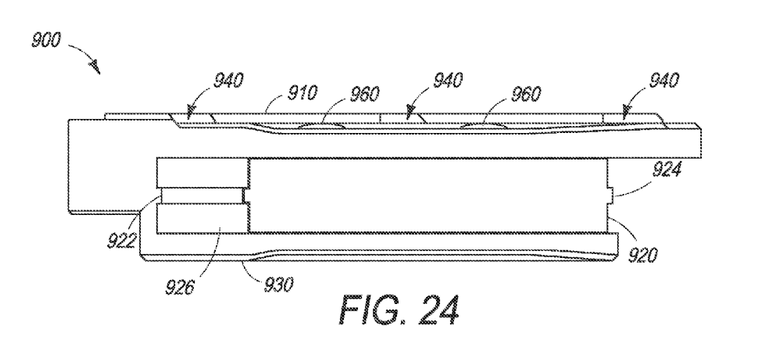
FIG. 24 shows a bottom view of the chain guide of FIG. 19.
Figure 25:
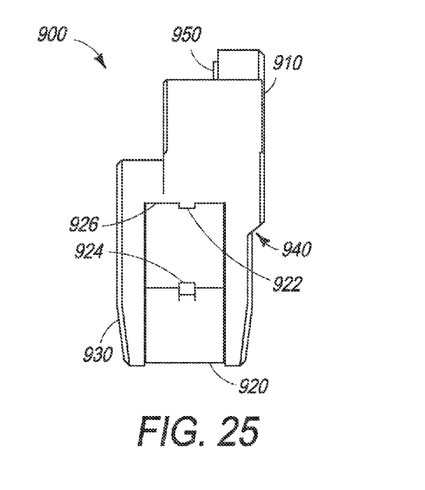
FIG. 25 shows a front view of the chain guide of FIG. 19.
Figure 26:
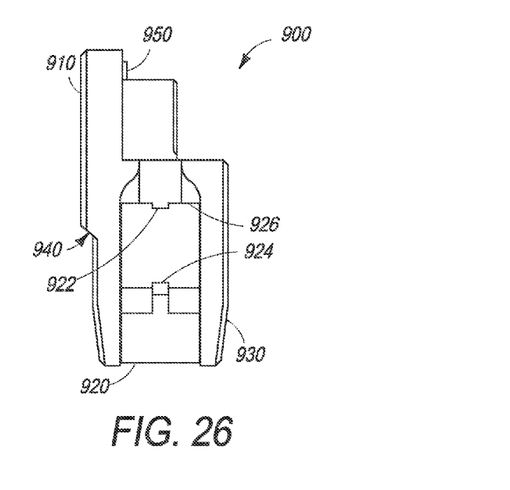
FIG. 26 shows a back view of the chain guide of FIG. 19.

FIG. 24 is a schematic diagram of a bottom view of chain guide 900. Upper surface 926 connects outer wall 910 and inner wall 930 forming the upper boundary of the channel from the front edge of chain guide 900 to 50% of the longitudinal length of chain guide 900. Upper surface 926 includes ridge 922 longitudinally along the bottom side and is visible from the bottom. Ridge 922 runs the length of upper surface 926 along the longitudinal axis at the centerline. As shown in FIGS. 25 and 26, insert ridge 924 and ridge 924 are aligned along the longitudinal centerline of removable chain guide insert 920 and upper surface 926, and serve to align the chain as it travels through the channel of the chain guide.

Removable chain guide insert 920 is configured with an essentially rectangular body. Removable chain guide insert 920 is housed between inner wall 930 and outer wall 920 and secured by fasteners. Further, the upper surface of removable chain guide insert 920 is oriented below the motorcycle chain. Removable chain guide insert 920 is further configured such that a bottom edge aligns with the bottom edge of the inner wall 930 and the bottom edge of the outer wall 910.

Figure 27:
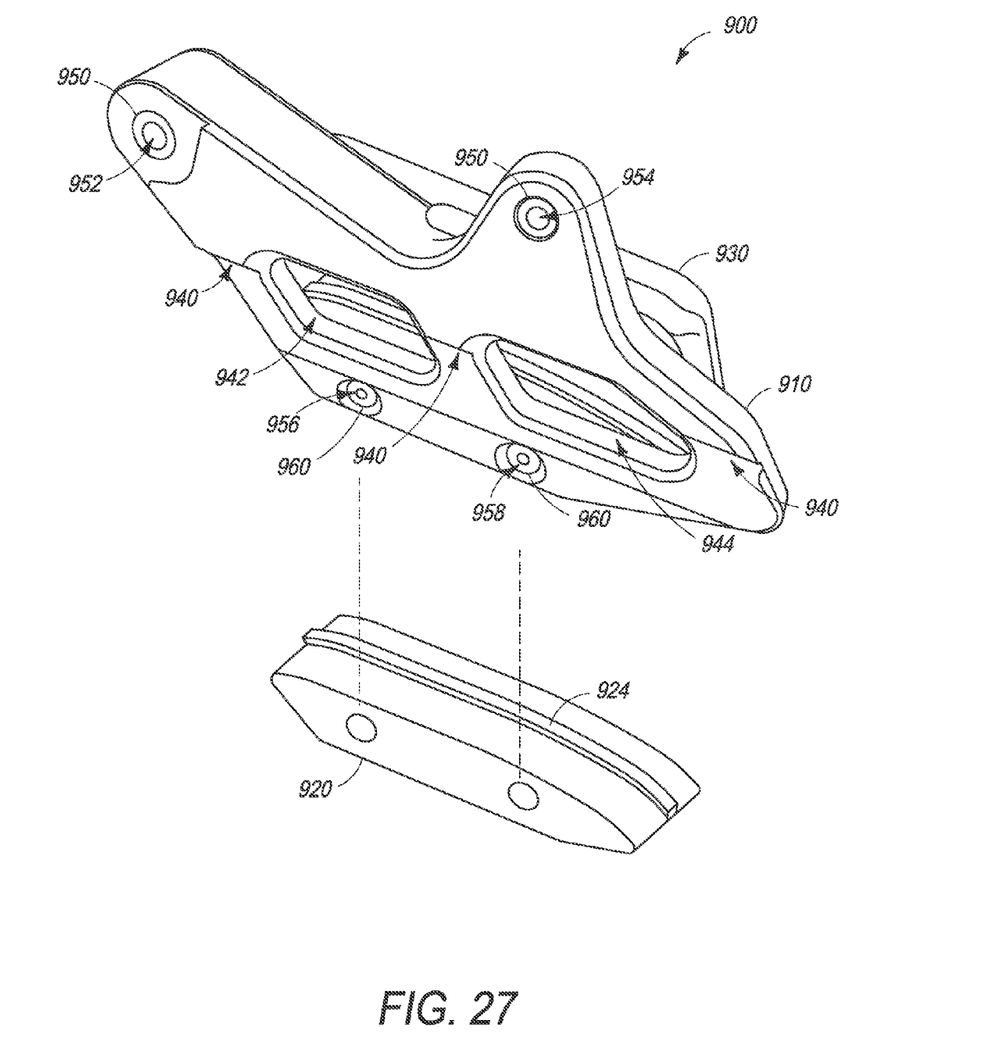
FIG. 27 shows an exploded isometric view of the chain guide of FIG. 19.

FIG. 27 schematically illustrates an exploded isometric view of chain guide 900.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A chain guide for guiding a chain traveling around a sprocket supported on a frame of a motorcycle, the chain guide comprising:
a plastic chain guide support having a substantially U-shaped body including an outer wall, a bottom portion, and an inner wall formed of a single piece of material with an outer surface and a channel formed along an inner surface of the body;
wherein the outer wall and the inner wall have a first thickness along a top edge and downward to a bevel to a second, smaller thickness downward to a bottom edge along an outer surface;
wherein the plastic chain guide support is further configured to house a removable chain guide insert in at least a portion of the channel, the removable chain guide insert oriented such that a surface of the removable chain guide insert is positioned toward the chain running through the channel.

2. The chain guide of claim 1, wherein a shelf along the inward facing side of the inner wall and the outer wall of the plastic chain guide support is machined such that the thickness of both the inner wall and the outer wall is reduced by 40-45% from the top edge to 60-70% of the height and extends longitudinally from a front leading edge of the plastic chain guide support for half the length of the plastic chain guide support.

3. The chain guide of claim 1, wherein the plastic chain guide support is further configured to house the removable chain guide insert such that:
the removable chain guide insert is positioned inside of the body to be contacted on two sides by the inner wall and the outer wall of the body and the removable chain guide insert is supported by a shelf on the outer wall and inner wall of the chain guide support along the bottom edge of the removable chain guide insert;
the removable chain guide insert provides lateral support to the inner wall and the outer wall of the plastic chain guide support; and
the removable chain guide insert increases the cross sectional area around one or more of a plurality of mounting holes in the inner wall and the outer wall of the plastic chain guide support.

4. The chain guide of claim 1, wherein the inner wall is configured such that:
the inner wall is a first thickness along the top edge and downward to a bevel to a second, smaller thickness downward to a bottom edge along an outer surface;
the bevel extending longitudinally from the front edge to a back edge of the inner wall and interrupted by one or more openings in the inner wall; and
the thinner wall portion is 25-40% thinner than the thicker wall portion.

5. The chain guide of claim 4, wherein the inner wall is configured such that a top edge of the bevel is located 25-30% from the top edge as measured along a front edge of the inner wall, the bevel sloping from the thicker wall portion to the thinner wall portion at an angle of 20 to 40 degrees from vertical.

6. The chain guide of claim 1, wherein the outer wall is configured such that:
the outer wall is a first thickness along the top edge and downward to a bevel to a second, smaller thickness downward to a bottom edge along an outer surface;
the bevel extending longitudinally from the front edge to a back edge of the outer wall and interrupted by one or more openings in the outer wall; and
the thinner wall portion is 25-40% thinner than the thicker wall portion.

7. The chain guide of claim 6, wherein the outer wall is configured such that the topmost edge of the bevel is located 25-30% from the top edge as measured along a front edge of the outer wall, the bevel sloping from the thicker wall portion to the thinner wall portion at an angle of 20 to 40 degrees from vertical.

8. The chain guide of claim 1, wherein the removable chain guide insert is further configured such that:
an outer wall and an inner wall project upward and form a U-shape, such that a top edge of the removable chain guide insert aligns with the top edge of the inner wall of the chain guide body and the top edge of the outer wall of the chain guide body.

9. The chain guide of claim 1, wherein the removable chain guide insert includes a ridge structure, the ridge structure protruding from the bottom surface and extending along a longitudinal centerline of the removable chain guide insert.

10. The chain guide of claim 1, wherein the bottom portion of the body of the chain guide includes a ridge structure, the ridge structure protruding from the upper surface toward the chain and extending along a longitudinal centerline from the front edge of the body and aft ending at a slope, the slope configured such that at the forward edge, the bottom portion has a first thickness and at an aft edge, a second, smaller thickness.

11. The chain guide of claim 1, wherein the plastic chain guide support further includes an opening in the inner wall and the outer wall of the U-shaped body, the opening configured to allow expulsion of debris during chain guide operation.

12. The chain guide of claim 1, wherein the chain guide body is configured in an inverted U-shape, wherein the inner wall and the outer wall are further configured with a plurality of mounting holes along the bottom edge.

13. The chain guide of claim 12, wherein the chain guide body is configured to house the removable chain guide insert such that the removable chain guide insert forms a bottom surface of the channel.

14. A chain guide for guiding a chain traveling around a sprocket supported on a frame of a motorcycle, the chain guide comprising:
a plastic chain guide support having a substantially U-shaped body with a channel formed along an inner surface of the body, the channel being bounded by inner and outer walls and a bottom portion of the U-shaped body, the body including an outer surface and having a first thickness at a top edge of the inner and outer walls and downward to a bevel on the outer surface to a second smaller thickness at the bottom edge, the body further including a plurality of mounting holes positioned adjacent a top edge of the outer wall and the inner wall, each mounting hole being sized to receive a bushing and a fastener for securing the chain guide to the frame of the motorcycle;

wherein the plastic chain guide support further is configured to house a removable plastic chain guide insert such that a surface of the removable chain guide insert faces toward the chain in at least a portion of the channel.

15. The chain guide of claim 14, wherein the plastic chain guide support is formed of a single piece of material.

16. The chain guide of claim 14, wherein the plastic chain guide support further is configured such that the bushing and fastener for securing the chain guide to the frame of the motorcycle secures the plastic chain guide insert in place.

17. The chain guide of claim 14, wherein the removable plastic chain guide insert is further configured such that:

an outer wall and an inner wall project upward from a body of the removable plastic chain guide insert and form a U-shape, such that a top edge of the removable plastic chain guide insert aligns with the top edge of the inner wall of the chain guide support and the top edge of the outer wall of the chain guide support.

18. The chain guide of claim 14, wherein the outer wall and the inner wall contain at least two mounting holes.

19. The chain guide of claim 1, wherein the chain guide body is configured in an inverted U-shape, wherein the inner wall and the outer wall are further configured with a plurality of mounting holes along the bottom edge; and wherein the chain guide body is further configured to house the removable chain guide insert such that the removable chain guide insert forms a bottom surface of the channel.

20. A plastic chain guide having a substantially U-shaped portion for guiding a chain on a motorcycle, comprising:

a U-shaped body with a channel formed therein and sized to accommodate a drive chain of a motorcycle, the body including a plurality of mounting holes configured to receive a bushing and a fastener to mount the body to a frame of a motorcycle, and a plurality of ejection holes for ejecting material from the U-shaped body;

wherein the U-shaped body further is configured with a first thickness beginning at a top edge downward to a bevel to a second smaller thickness downward to a bottom edge, the first thickness reinforcing the U-shaped body around the plurality of mounting holes;

wherein the U-shaped body further is configured such that a removable plastic chain guide insert may be secured by the bushing and fastener to mount the body to the frame of the motorcycle above the drive chain.

21. A chain guide for guiding a chain traveling around a sprocket supported on a frame of a motorcycle, the chain guide comprising:

a plastic chain guide support having a substantially U-shaped body including an outer wall, a bottom portion, and an inner wall formed of a single piece of material with an outer surface and a channel formed along an inner surface of the body;

wherein the plastic chain guide support is further configured to house a removable chain guide insert in at least a portion of the channel, the removable chain guide insert oriented such that a surface of the removable chain guide insert is positioned toward the chain running through the channel;

wherein the plastic chain guide support is further configured with a shelf on the inner surface of at least the outer wall and the removable chain guide insert is configured such that a portion of the surface rests upon the shelf; and wherein the chain guide comprises a top ridge structure and a bottom ridge structure, the ridge structures extending along a longitudinal centerline of the chain guide to align the chain as it runs through the channel.

22. The chain guide of claim 21, wherein at least one of the inner wall and the outer wall comprises one or more mounting holes configured to receive a bushing and a fastener to mount the body to a frame of a motorcycle, and at least one ejection hole for ejecting material from the U-shaped body.

23. The chain guide of claim 21, wherein the removable chain guide insert comprises one or more insert mounting holes that align with the one or more mounting holes.

24. The chain guide of claim 21, wherein the removable chain guide insert is further configured such that:

an outer wall and an inner wall project upward and form a U-shape, such that a top edge of the removable chain guide insert aligns with the top edge of at least one of the inner wall and the outer wall of the chain guide body.

* * * * *